United States Patent
Hong et al.

(10) Patent No.: US 11,692,055 B2
(45) Date of Patent: Jul. 4, 2023

(54) COMPOSITION FOR FORMING POLYURETHANE FILM AND ARTICLE COMPRISING COATING LAYER DERIVED FROM THE SAME

(71) Applicant: KOREA INSTITUTE OF INDUSTRIAL TECHNOLOGY, Cheonan-si (KR)

(72) Inventors: Sung Woo Hong, Seongnam-si (KR); Sung Koo Lee, Seongnam-si (KR); Pyong Hwa Hong, Seoul (KR); Gyeong Min Moon, Suwon-si (KR); Jin Sil Kim, Cheonan-si (KR)

(73) Assignee: Korea Institute of Industrial Technology, Cheonan-si (KR)

( * ) Notice: Subject to any disclaimer, the term of this patent is extended or adjusted under 35 U.S.C. 154(b) by 0 days.

(21) Appl. No.: 17/103,479

(22) Filed: Nov. 24, 2020

(65) Prior Publication Data
US 2021/0155733 A1    May 27, 2021

(30) Foreign Application Priority Data

Nov. 25, 2019 (KR) .................. 10-2019-0152647

(51) Int. Cl.
| | |
|---|---|
| *C08G 18/08* | (2006.01) |
| *C08G 18/62* | (2006.01) |
| *C08G 18/73* | (2006.01) |
| *C08J 5/18* | (2006.01) |
| *B32B 27/40* | (2006.01) |
| *C08L 75/12* | (2006.01) |
| *C08G 18/79* | (2006.01) |
| *C09D 175/04* | (2006.01) |

(52) U.S. Cl.
CPC .......... *C08G 18/0833* (2013.01); *B32B 27/40* (2013.01); *C08G 18/0814* (2013.01); *C08G 18/6225* (2013.01); *C08G 18/6229* (2013.01); *C08G 18/6283* (2013.01); *C08G 18/73* (2013.01); *C08G 18/792* (2013.01); *C08J 5/18* (2013.01); *C08L 75/12* (2013.01); *C09D 175/04* (2013.01)

(58) Field of Classification Search
CPC ............ C08G 18/0833; C08G 18/6225; C08G 18/73; C08G 18/0814; C08G 18/6229; C08G 18/792; C08G 18/6283; C08J 5/18; C09D 175/04; B32B 27/40; C08L 75/12
See application file for complete search history.

(56) References Cited

U.S. PATENT DOCUMENTS

| | | | |
|---|---|---|---|
| 6,887,937 B1 | 5/2005 | Vandevoorde et al. | |
| 2003/0124079 A1 | 7/2003 | Mougin et al. | |
| 2013/0011590 A1* | 1/2013 | Subramanian | ....... C09D 175/04 428/34.7 |
| 2019/0203030 A1 | 7/2019 | Cheong et al. | |
| 2020/0079914 A1 | 3/2020 | Chung et al. | |

FOREIGN PATENT DOCUMENTS

| | | | | |
|---|---|---|---|---|
| CN | 104371085 A | * | 2/2015 | ............. C08G 18/12 |
| CN | 106632848 A | | 5/2017 | |
| CN | 108102456 A | | 6/2018 | |
| EP | 0462287 A1 | * | 12/1991 | |
| JP | 2001525883 A | | 12/2001 | |
| KR | 1020020008779 A | | 1/2002 | |
| KR | 1020180068776 A | | 6/2018 | |
| KR | 1020180114725 A | | 10/2018 | |
| KR | 101991700 B1 | | 6/2019 | |
| KR | 102040083 B1 | | 11/2019 | |
| WO | WO-2019073039 A1 | * | 4/2019 | ............. A61K 8/553 |

OTHER PUBLICATIONS

André Laschewsky, "Structures and Synthesis of Zwitterionic Polymers", Polymers, May 23, 2014, 6, 1544-1601.

Shaojun Chen et al., "Development of zwitterionic polyurethanes with multi-shape memory effects and self-healing properties", Journal of Materials Chemistry A, Dec. 8, 2014.

* cited by examiner

*Primary Examiner* — Rabon A Sergent
(74) *Attorney, Agent, or Firm* — Rabin & Berdo, P.C.

(57) ABSTRACT

The present disclosure relates to a composition for forming a polyurethane film, a polyurethane film derived from the composition and an article comprising a substrate and the polyurethane film, and the composition for forming a polyurethane film comprises an OH group-containing polymer; a curing agent; and an amphoteric ion-based polymer.

8 Claims, 2 Drawing Sheets

COMPOSITION FOR FORMING POLYURETHANE FILM AND ARTICLE COMPRISING COATING LAYER DERIVED FROM THE SAME

TECHNICAL FIELD

The present disclosure relates to a composition for forming a polyurethane film and an article comprising a coating layer derived from the same.

The present application claims the benefit of Korean Patent Application No. 10-2019-0152647 filed on Nov. 25, 2019 with the Korean Intellectual Property Office, the disclosure of which is incorporated herein by reference in its entirety.

BACKGROUND ART

Polyurethane is a typical compound used in a film/coating for automotive exterior components. The urethane bonds of the polyurethane may be formed by bonds between a hydroxyl (OH) group and an isocyanate (NCO) group.

The polyurethane may be classified into a linear polyurethane and a crosslinked polyurethane. One method for preparing the linear polyurethane includes condensation reaction between a polyol having two hydroxyl groups and a diisocyanate compound. Additionally, an exemplary method for preparing the crosslinked polyurethane includes condensation reaction between a polyol having two or more hydroxyl groups and an isocyanate compound including three or more NCO groups, condensation reaction between a polyol having three or more hydroxyl groups and a diisocyanate compound, or condensation reaction between a polyol having three or more hydroxyl groups and an isocyanate compound including three or more NCO groups, but is not limited thereto.

A composition for forming a film of polyurethane, i.e., a composition for forming a polyurethane film is suitable for forming a coating layer such as clear coat used in automotive exterior components in terms of fabrication cost, low temperature cure and adhesion to a substrate.

However, when the resulting polyurethane film coating layer is physically damaged, for example, scratched by washing or for any other reason, a metal material protected by the coating layer corrode, causing functional damage of the material as well as shape quality deterioration of the product.

To solve this problem, an elastic recovery polyurethane (for example, Scratch Shield® available from Nissan Paint in Japan) is known, but since it is the technology using flexibility of elastics, the elastic recovery polyurethane has low density of the layer and a low degree of crosslinking, and as a consequence, a low surface modulus and low stiffness, posing the weather resistance problem. Additionally, deformation occurring when pressed can be recovered by elasticity, but there is a limitation in the self-healing recovery from damage caused by the ambient environment such as scratches.

DISCLOSURE

Technical Problem

The present disclosure is designed to solve the above-described problems, and therefore the present disclosure is directed to providing a composition for forming a polyurethane film for achieving more effective self-healing recovery in the outermost coating layer of products including vehicles, and an article comprising a coating layer derived from the same.

Technical Solution

According to an aspect of the present disclosure, in a first embodiment, there is provided a composition for forming a polyurethane film, comprising an OH group-containing polymer; a curing agent; and an amphoteric ion-based polymer, wherein the curing agent is an isocyanate-based compound.

According to a second embodiment of the present disclosure, in the first embodiment, the amphoteric ion-based polymer may contain an OH group.

According to a third embodiment of the present disclosure, in the first embodiment, the amphoteric ion-based polymer may be represented by the following Formula 1:

[Formula 1]

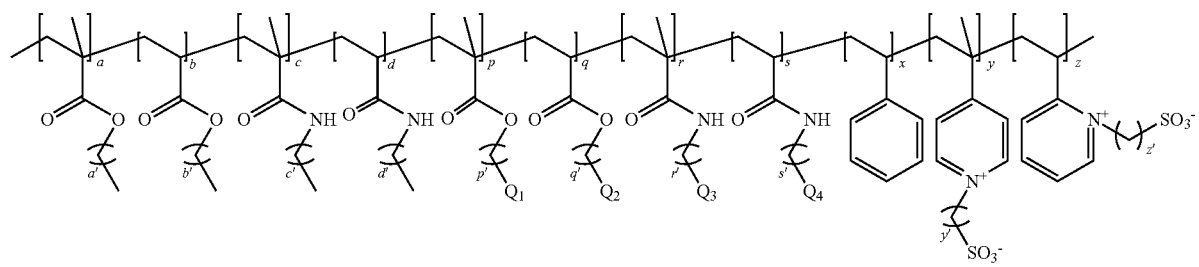

where each of a, b, c, d, p, q, r, s, x, y, z, a', b', c', d', p', q', r', s' is an integer of 0 or greater, the sum of a+b+c+d is an integer of 1 or greater, the sum of p+q+r+s is an integer of 1 or greater, and the sum of y+z is an integer of 1 or greater, each of the y' and z' is independently an integer of 1 or greater, and $Q_1$, $Q_2$, $Q_3$, and $Q_4$ are nucleophilic functional groups.

According to a fourth embodiment of the present disclosure, in the third embodiment, each of the $Q_1$, $Q_2$, $Q_3$, and $Q_4$ may be independently OH, $NH_2$, COOH, SH, or NCO.

According to a fifth embodiment of the present disclosure, in the second embodiment, the amphoteric ion-based polymer may be represented by the following Formula 2:

[Formula 2]

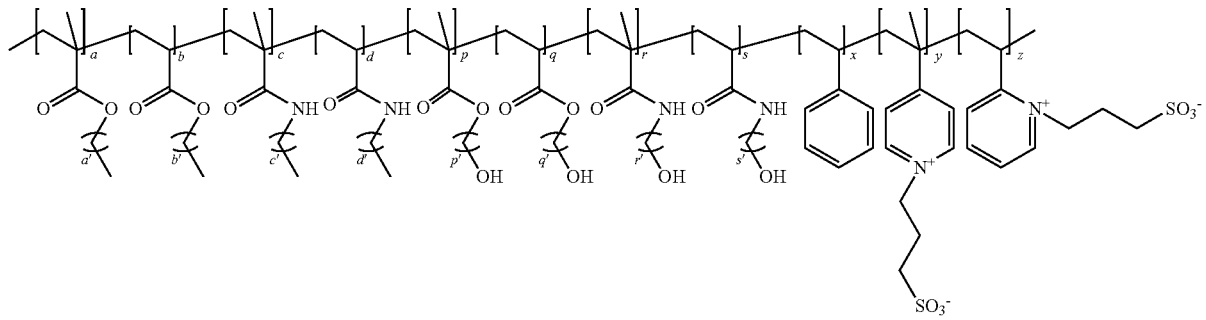

where each of a, b, c, d, p, q, r, s, x, y, z, a', b', c', d', p', q', r', s' is an integer of 0 or greater, and the sum of a+b+c+d is an integer of 1 or greater, the sum of p+q+r+s is an integer of 1 or greater, and the sum of y+z is an integer of 1 or greater.

According to a sixth embodiment of the present disclosure, in any one of the first to fifth embodiments, the OH group-containing polymer may be an OH group-containing polyacrylate-based compound; an OH group-containing polymethacrylate-based compound; an OH group-containing polystyrene-based compound; a copolymer of at least two of an acrylate-based monomer, a methacrylate-based monomer or a styrene-based monomer; or a mixture thereof.

According to another aspect of the present disclosure, in a seventh embodiment of the present disclosure, there is provided a polyurethane film derived from the composition for forming a polyurethane film according to any one of the first to sixth embodiments.

According to still another aspect of the present disclosure, in an eighth embodiment of the present disclosure, there is provided an article comprising a substrate, and the polyurethane film according to the seventh embodiment, positioned on at least one surface of the substrate.

According to a ninth embodiment of the present disclosure, in the eighth embodiment, the substrate may be a metal substrate, a glass substrate, a ceramic substrate or a plastic substrate.

Advantageous Effects

The coating layer formed from the composition for forming a polyurethane film according to the present disclosure may show the self-healing effect in a shorter time by using ambient moisture.

In particular, the coating layer formed from the composition for forming a polyurethane film according to the present disclosure may achieve a high self-healing recovery ratio close to 100% and a rapid self-healing rate in extreme situations using ambient moisture.

Additionally, the coating layer formed from the composition for forming a polyurethane film according to the present disclosure may show the self-healing effect over a wider area.

The composition for forming a polyurethane film according to the present disclosure can be used in not only transport equipment such as vehicles but also functional clothing materials, flat displays and flat electronic devices, flexible displays and flexible electronic devices, and solar-powered devices.

DETAILED DESCRIPTION

Figure 1A:
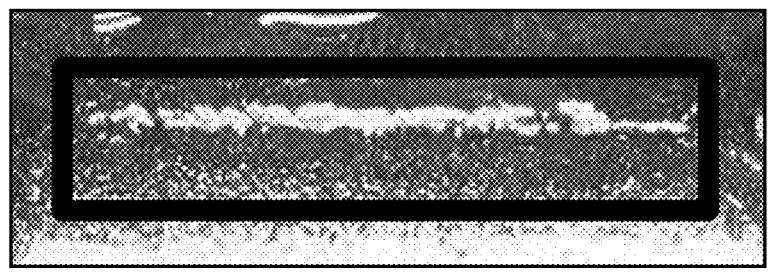
FIG. 1a is a photographic image of scratches artificially generated in a coating layer obtained in example 1.

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, configuration shown in the embodiments described herein is just a most preferred embodiment, and does not fully represent the technical aspects of the disclosure, so it should be understood that other equivalents and modifications could have been made thereto at the time of filing the application.

The term "self-healable" as used herein refers to the ability to heal (recover/repair) a damaged material to the original condition automatically and spontaneously without any external mediation in a broad sense, and the recovery of damage caused by an external force to the original condition to some extent in a narrow sense. The "self-healable" according to the present disclosure refers to the recovery of damage using an amphoteric ion-based polymer included in a material and ambient moisture when a crack or a little damage occurs on the surface of the material due to an external force.

A composition for forming a polyurethane film according to an aspect of the present disclosure comprises an OH group-containing polymer; a curing agent; and an amphoteric ion-based polymer.

The amphoteric ion-based polymer may be any amphoteric ion-based polymer comprising at least one atom with a positive charge and at least one atom with a negative charge on one side chain. The amphoteric ion-based polymer may be any amphoteric ion-based polymer comprising at least one atom with a positive charge, at least one atom with a negative charge on one side chain, and at least one functional group such as an OH group that can react with isocyanate-based compound.

Non-limiting examples of the amphoteric ion-based polymer of the present disclosure may be represented by Formula 1 or 2.

into the inside of the formed polyurethane coating and only the surface of the polyurethane coating may be modified, and thus amphoteric ions may be only distributed densely on the surface. Accordingly, when the prepared polyurethane is modified by the amphoteric ion compound with an addition of a predetermined compound, it is expected that the structure of the finally obtained coating will be different from the

[Formula 1]

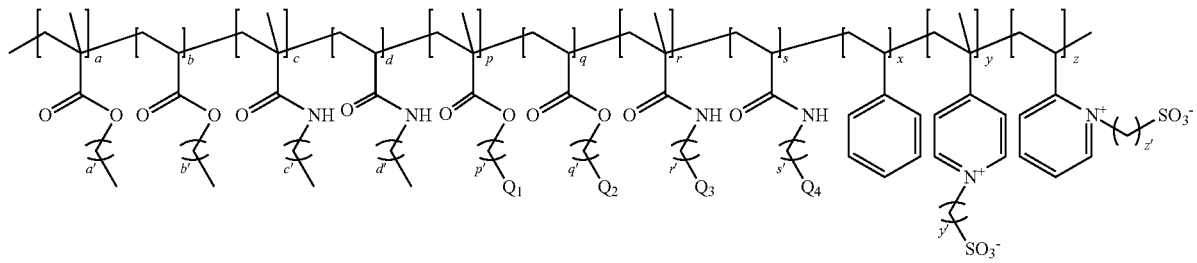

In the above Formula 1,
each of a, b, c, d, p, q, r, s, x, y, z, a', b', c', d', p', q', r', s' is an integer of 0 or greater,
the sum of a+b+c+d is an integer of 1 greater, the sum of p+q+r+s is an integer of 1 greater, and the sum of y+z is an integer of 1 greater,
each of y' and z' is independently an integer of 1 or greater, and
$Q_1$, $Q_2$, $Q_3$, and $Q_4$ are nucleophilic functional groups.
Each of the $Q_1$, $Q_2$, $Q_3$, and $Q_4$ may be independently OH, $NH_2$, COOH, SH, or NCO.

present disclosure, and as a consequence, there will be a difference in the entire property of the coating.

According to a specific embodiment of the present disclosure, the amphoteric ion-based polymer may be included in an amount of between more than 0 and 100 parts by weight or less, based on 100 parts by weight of the OH group-containing polymer. Additionally, when the amphoteric ion-based polymer has a functional group such as an OH group that can react with isocyanate-based compound,

[Formula 2]

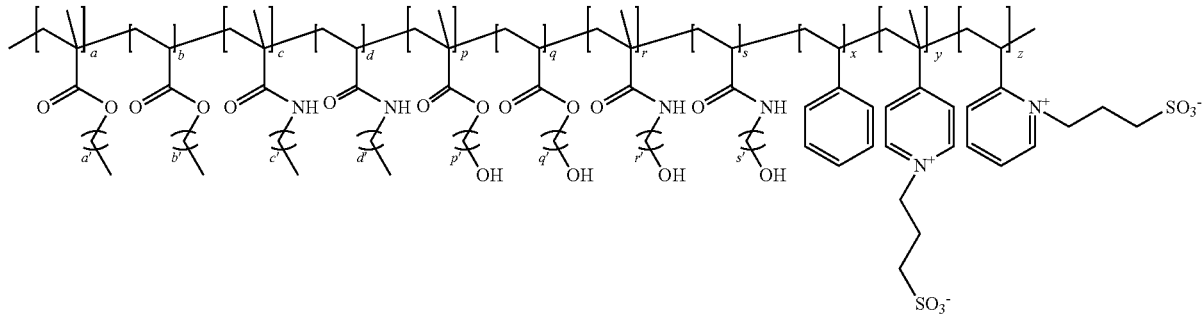

In the above Formula 2,
each of a, b, c, d, p, q, r, s, x, y, z, a', b', c', d', p', q', r', s' is an integer of 0 or greater, and
the sum of a+b+c+d is an integer of 1 or greater, the sum of p+q+r+s is an integer of 1 or greater, and the sum of y+z is an integer of 1 or greater.

According to the present disclosure, the amphoteric ion-based polymer may be fed together with an OH group-containing polymer and a curing agent to form a composition for forming a polyurethane film, and then prepare a polyurethane.

As opposed to the polyurethane preparation method of the present disclosure, when the prepared polyurethane is modified by the amphoteric ion compound with an addition of a predetermined compound, modification is not accomplished the amphoteric ion-based polymer may be used to prepare a urethane together with the curing agent without the OH group-containing polymer.

According to a specific embodiment of the present disclosure, the OH group-containing polymer may be an OH group-containing polyacrylate-based polymer; an OH group-containing polymethacrylate-based polymer; an OH group-containing polystyrene-based polymer; a copolymer of at least two of an acrylate-based monomer, a methacrylate-based monomer or a styrene-based monomer; or a mixture thereof.

The OH group-containing polymer may be designed to have a variety of weight average molecular weights according to the purpose of use. In a specific embodiment of the present disclosure, the OH group-containing polymer may have the number average molecular weight between 200 and 1,000,000, and in this case, a more preferable effect will be provided in terms of the mechanical properties and self-healing properties of the coating and film.

The curing agent of the present disclosure may be an isocyanate-based compound, and to be specific, a multifunctional isocyanate containing two or more isocyanate groups.

The multifunctional isocyanate according to an embodiment of the present disclosure may be an aliphatic, aromatic, alicyclic, or araliphatic compound containing two or more isocyanate groups in the molecule structure.

The aliphatic isocyanate compound may be at least one of aliphatic isocyanate selected from the group consisting of ethylene diisocyanate, trimethylene diisocyanate, tetramethylene diisocyanate, hexamethylene diisocyanate (HMDI), octamethylene diisocyanate, nonamethylene diisocyanate, dodecamethylene diisocyanate, 2,2-dimethylpentane diisocyanate, 2,2,4-trimethyl hexamethylene diisocyanate, decamethylene diisocyanate, butene diisocyanate, 1,3-butadiene-1,4-diisocyanate, 2,4,4-trimethyl hexamethylenediisocyanate, 1,6,11-undecane triisocyanate, 2,2,4-trimethylhexamethylene diisocyanate, lysine diisocyanate, 2,6-diisocyanatemethylcaproate, bis(2-isocyanate-ethyl)fumarate, bis(2-isocyanatoethyl)carbonate, 2-isocyanateethyl-2,6-diisocyanatehexanoate, 1,3,5-hexamethylenetriisocyanate, 1,8-diisocyanato-4-isocyanate, bis(isocyanatoethyl)ether, 1,4-butyleneglycoldipropylether-ω, ω'-diisocyanate, lysine diisocyanato methylester, lysine triisocyanate, 2-isocyanatoethyl-2,6-diisocyanato ethyl-2,6-diisocyanato hexanoate, 2-isocyanato propyl-2,6-diisocyanato hexanoate, 2,6-di(isocyanatomethyl)furan, 1,3-bis(6-isocyanato hexyl)-uretidine-2,4-dione, and 1,3,5-tris(6-isocyanato hexyl)isocyanurate.

In the multifunctional isocyanate compound, the alicyclic isocyanate may be at least one of alicyclic isocyanate selected from the group consisting of isophorone diisocyanate (IPDI), 4,4'-dicyclohexylmethane diisocyanate, cyclohexylene diisocyanate, methylcyclohexylene diisocyanate, bis(2-isocyanateethyl)-4-cyclohexane-1,2-dicarboxylate, 2,5-norbornane diisocyanate, 2,6-norbornane diisocyanate, 2,2-dimethyl dicyclohexylmethane diisocyanate, bis(4-isocyanato-n-butylidene)pentaerythritol, dimer acid diisocyanate, 2-isocyanatomethyl-3-(3-isocyanato propyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-3-(3-isocyanatopropyl)-6-(2-isocyanatoethyl)-bicyclo[2.1.1]-heptane, 2-isocyanatomethyl-2-(3-isocyanatopropyl)-5-(2-isocyanatoethyl)-bicyclo[2.1.1]-heptane, 2-isocyanatomethyl-2-(3-isocyanatopropyl)-6-(2-isocyanatoethyl)-bicyclo[2.2.1]-heptane, and norbornane bis(isocyanatomethyl).

In the multifunctional isocyanate compound, the araliphatic isocyanate may be at least one of araliphatic isocyanate selected from the group consisting of 1,3-bis(isocyanatomethyl) benzene(m-xylene diisocyanate, m-XDI), 1,4-bis(isocyanatomethyl) benzene(p-xylene diisocyanate, p-XDI), 1,3-bis(2-isocyanato propan-2-yl) benzene(m-tetramethyl xylene diisocyanate, m-TMXDI), 1,3-bis(isocyanatomethyl)-4-methylbenzene, 1,3-bis(isocyanatomethyl)-4-ethylbenzene, 1,3-bis(isocyanatomethyl)-5-methylbenzene, 1,3-bis(isocyanatomethyl)-4,5-dimethylbenzene, 1,4-bis(isocyanatomethyl)-2,5-dimethylbenzene, 1,4-bis(isocyanatomethyl)-2,3,5,6-tetramethylbenzene, 1,3-bis(isocyanatomethyl)-5-tert-butyl benzene, 1,3-bis(isocyanatomethyl)-4-chlorobenzene, 1,3-bis(isocyanatomethyl)-4,5-dichlorobenzene, 1,3-bis(isocyanatomethyl)-2,4,5,6-tetrachloro benzene, 1,4-bis(isocyanatomethyl)-2,3,5,6-tetrachloro benzene, 1,4-bis(isocyanatomethyl)-2,3,5,6-tetrabromo benzene, 1,4-bis(2-isocyanatoethyl)benzene, 1,4-bis(isocyanatomethyl) naphthalene, xylylene diisocyanate, bis(isocyanatoethyl) benzene, bis(isocyanato propyl)benzene, α,α,α',α'-tetramethyl xylylene diisocyanate, bis(isocyanato butyl)benzene, bis(isocyanato propyl)naphthalene, bis(isocyanatomethyl) diphenylether, and bis(isocyanatoethyl)phthalate.

In the composition for forming a polyurethane film according to the present disclosure, it is basically preferred to determine the composition ratio of the polymer containing the OH group at the terminal of the side chain and the multifunctional isocyanate compound containing two or more isocyanate groups at the terminal, taking into account the stoichiometric reaction of the OH group in the OH group-containing polymer and the isocyanate group of the multifunctional isocyanate compound.

In a specific embodiment of the present disclosure, in the composition for forming a polyurethane film, an equivalent amount of the crosslinking agent to the sum of OH groups of the OH group-containing polymer, i.e., the OH group-containing polymer and the amphoteric ion-based polymer containing the OH group (a ratio of the total number of OH groups and the total number of isocyanates) may be more than 0 and 1 or less.

According to another aspect of the present disclosure, there is provided a polyurethane film derived from the composition for forming a polyurethane film.

The polyurethane film may be formed by stirring and mixing an OH group-containing polymer, a curing agent, an amphoteric ion-based polymer, and a solvent to prepare a composition for forming a polyurethane film; and coating the composition for forming a polyurethane film on a substrate and drying the composition.

The composition for forming a polyurethane film may be obtained by mixing the OH group-containing polymer, the curing agent, the amphoteric ion-based polymer, and the solvent, and may be obtained by preparing a solution like an OH group-containing polymer solution, a curing agent solution and an amphoteric ion-based polymer solution and stirring and mixing the solutions at room temperature (for example, 25° C.).

In the step of forming the composition for forming a polyurethane film, the stirring and mixing may be performed for a short time, for example, 1 to 30 min, 10 min to 30 min, or 10 to 15 min.

The drying may be performed, for example, at 50 to 200° C. for 10 to 120 min, but is not limited thereto.

The method may further comprise degassing the composition for forming a polyurethane film between the step of preparing the composition for forming a polyurethane film and the step of coating the composition on the substrate and drying the composition. The degassing may be performed, for example, for 1 to 20 min, but is not limited thereto.

The reaction for forming the polyurethane film, i.e., urethane reaction, may be performed by reaction between the OH group of the OH group-containing polymer and the isocyanate group of isocyanate-based compound serving as the curing agent. In this instance, the amphoteric ion-based polymer may be used together to prepare a final polyurethane film through the urethane reaction, and in the case of the amphoteric ion-based polymer having a functional group such as an OH group that can react with isocyanate group of isocyanate-based compound, reaction of the amphoteric ion-based polymer with isocyanate-based compound may take place to form urethane bonds and finally a polyurethane film may be prepared.

Additionally, the composition for forming a polyurethane film may further comprise well-known additives, for example, chain extension agents, binding inhibitors, antistatic agents, antioxidants, biological stabilizing agents, chemical blowing agents, release agents, flame retardants, lubricants, colorants, flow improvers, fillers, adhesion promoters, catalysts, photostabilizers, brighteners, organic phosphorus compounds, oils, dyes, impact modifiers, reinforcing agents, reinforced fibers, weatherproofing agents and plasticizers.

The weight average molecular weight of polyurethane compound may or may not be measured according to the type of the polyurethane compound obtained in the present disclosure. That is, in case that the polyurethane compound obtained in the present disclosure is a crosslink type, the upper limit of the weight average molecular weight may be indefinite, and thus it is difficult to define the weight average molecular weight. Additionally, in case that the polyurethane compound obtained in the present disclosure is a linear type, when measuring by gel permeation chromatography using polystyrene as the reference material, the weight average molecular weight may range from about 1,000 to about 1,000,000.

Meanwhile, according to another aspect of the present disclosure, there is provided an article comprising a substrate; and the above-described polyurethane film positioned on at least one surface of the substrate.

The substrate according to an embodiment of the present disclosure may be a metal substrate or a plastic substrate.

The substrate according to an embodiment of the present disclosure may be a metal substrate, a glass substrate or a polymer substrate.

Specific examples of the articles may be transport equipment, for example, vehicles, aircraft and vessels; and information and electronic products, for example, tablet PCs, displays, smartphones and wearable devices; and articles in various fields, for example, defense and security products, household products and construction/industrial products.

Hereinafter, examples will be described in detail to help the understanding of the present disclosure. However, the examples of the present disclosure may be modified in other different forms, and the scope of the present disclosure should not be construed as being limited to the following examples. The examples of the present disclosure are provided to fully explain the present disclosure to those having ordinary knowledge in the art to which the present disclosure pertains.

Example 1

Radical polymerization was performed on a solution containing 20 mol % of styrene, 23 mol % of butyl methacrylate, 16 mol % of butyl acrylate and 41 mol % of 2-hydroxypropyl methacrylate such that an amount of solids was 50 wt % based on the butylacetate solvent to prepare a solution containing an OH group-containing polymer. 200 g (50 wt %, butyl acetate as a solvent) of the prepared OH group-containing polymer, 113 g (50 wt %, Butyl Acetate as a solvent) of HDI Trimer Isocyanate (Sigma-Aldrich) as a curing agent, 125 g of an amphoteric ion-based polymer, and dimethyl formamide (20 wt %) as a solvent were mixed to prepare a composition for forming a polyurethane film.

To prepare the amphoteric ion-based polymer, 80 mol % of styrene, 10 mol % of 2-hydroxypropyl methacrylate and 10 mol % of 4-vinyl pyridine monomer were mixed to prepare a 20 wt % solution based on dimethyl formamide, and an initiator was fed such that a target molecular weight was 3000 g/mol, followed by radical polymerization, to prepare a precursor. Subsequently, 1,3-propane sultone equal to the number of pyridine groups in the precursor was fed, causing reaction, to synthesize a final amphoteric ion-based polymer.

The OH group-containing polymer solution, the curing agent solution and the amphoteric ion-based polymer solution were stirred at room temperature for 3 minutes using a paste mixer and degassed for 2 minutes. Subsequently, the mixed solution was coated on a glass substrate in the loading amount of 100 g, and dried at 170° C. for 30 minutes to prepare a polyurethane film.

Comparative Example 1

A polyurethane film was prepared by the same method as example 1 except that the amphoteric ion-based polymer was not used.

Evaluation Example: Self-Healing Test

A self-healing test was performed using Hardness Test Pencil 318S. Scratches were created in the polyurethane film prepared in example 1 and comparative example 1 under the load of 1 kg using a scratch tip of tungsten 1.0 mm ISO standards. Subsequently, the polyurethane film was immersed in water for 10 seconds and taken out, and then a surface phenomenon of the scratches was observed using an optical microscope over time while applying heat of 75° C.

Figure 1B:
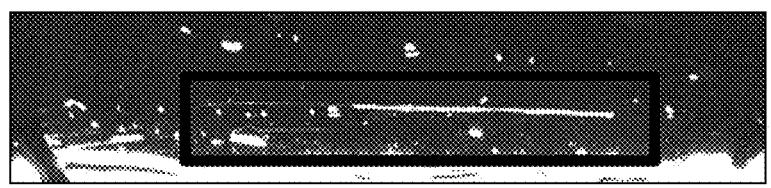
FIG. 1b is a photographic image of scratches artificially generated in a coating layer obtained in comparative example 1.
Figure 2A:
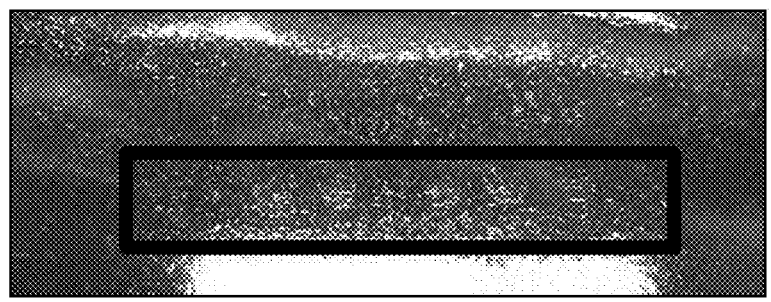
FIG. 2a is a photographic image after applying moisture to scratches of a coating layer obtained in example 1 and curing for a predetermined period of time.
Figure 2B:
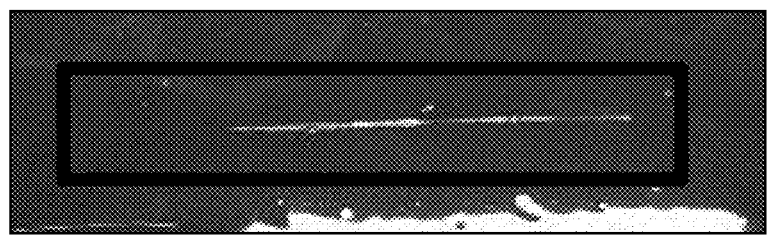
FIG. 2b is a photographic image after applying moisture to scratches of a coating layer obtained in comparative example 1 and curing for a predetermined period of time.

In the case of example 1 (FIGS. 1a, 2a), after 15 minutes passed, the scratches disappear and self-healing was observed, whereas in the case of comparative example 1 (FIGS. 1b, 2b), after 15 minutes passed, the scratches did not disappear. Through this, it can be seen that the urethane material comprising the amphoteric ion-based polymer according to the present disclosure has much higher self-healing recovery ratio and self-healing rate than the existing urethane materials having no amphoteric ion-based polymer.

What is claimed is:
1. A composition for forming a polyurethane film, comprising:
an OH group-containing polymer; a curing agent; and an amphoteric ion-based polymer, wherein the curing agent is an isocyanate-based compound,
wherein the amphoteric ion-based polymer contains an OH group, wherein the OH group-containing polymer is not an amphoteric ion-based polymer,
wherein the amphoteric ion-based polymer is represented by the following Formula 1:

[Formula 1]

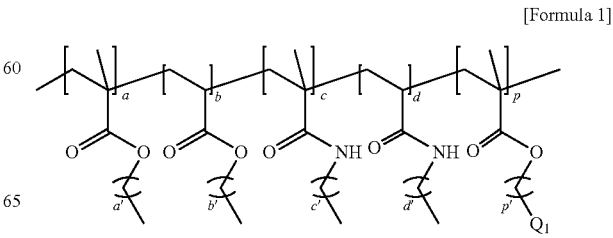

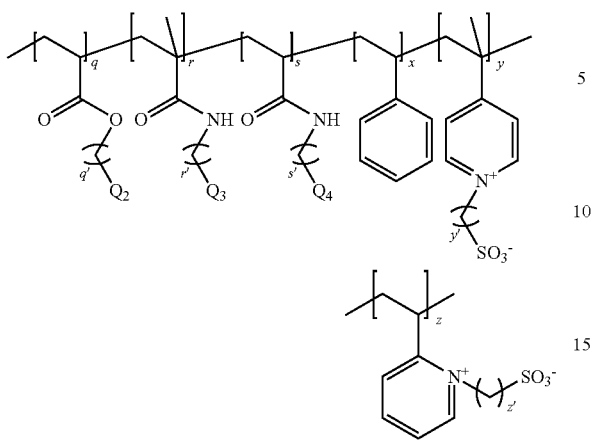

where each of a, b, c, d, p, q, r, s, x, y, z, a', b', c', d', p', q', r', s' is an integer of 0 or greater,
the sum of a+b+c+d is an integer of 1 or greater, the sum of p+q+r+s is an integer of 1 or greater, and the sum of y+z is an integer of 1 or greater,
each of the y' and z' is independently an integer of 1 or greater, and
$Q_1$, $Q_2$, $Q_3$, and $Q_4$ is independently OH, $NH_2$, COOH, SH, or NCO, and at least one of $Q_1$, $Q_2$, $Q_3$, and $Q_4$ is OH.

2. The composition for forming a polyurethane film according to claim 1, wherein the amphoteric ion-based polymer is represented by the following Formula 2:

[Formula 2]

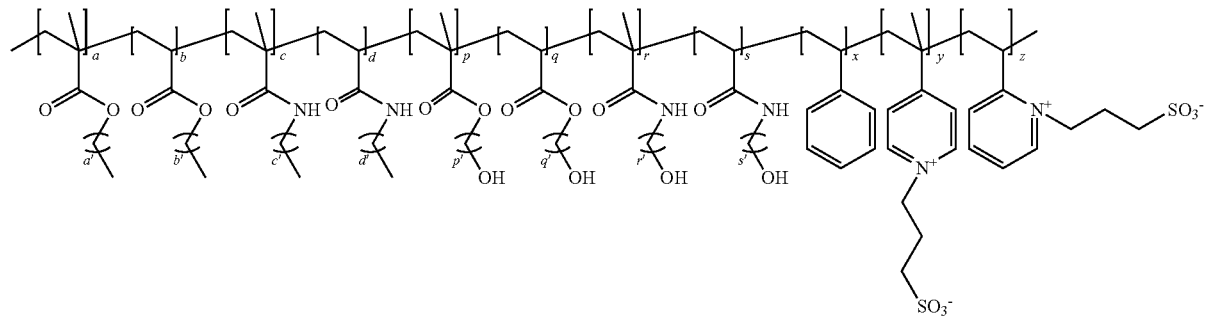

where each of a, b, c, d, p, q, r, s, x, y, z, a', b', c', d', p', q', r', s' is an integer of 0 or greater, and
the sum of a+b+c+d is an integer of 1 or greater, the sum of p+q+r+s is an integer of 1 or greater, and the sum of y+z is an integer of 1 or greater.

3. A polyurethane film derived from the composition for forming a polyurethane film according to claim 2.

4. The composition for forming a polyurethane film according to claim 1, wherein the OH group-containing polymer is an OH group-containing polyacrylate-based compound; an OH group-containing polymethacrylate-based compound; an OH group-containing polystyrene-based compound; a copolymer of at least two of an acrylate-based monomer, a methacrylate-based monomer or a styrene-based monomer; or a mixture thereof.

5. A polyurethane film derived from the composition for forming a polyurethane film according to claim 4.

6. A polyurethane film derived from the composition for forming a polyurethane film according to claim 1.

7. An article comprising:
a substrate; and
the polyurethane film according to claim 6, positioned on at least one surface of the substrate.

8. The article according to claim 7, wherein the substrate is a metal substrate, a glass substrate, a ceramic substrate or a plastic substrate.

* * * * *